J. BURT.

Vehicle Seats.

No. 5,446. Reissued June 17, 1873.

WITNESSES

W. T. Newman

Lawrence L. Leggett

INVENTOR

John Burt.

By Mills N. Leggett.

Attorney

AM. PHOTO-LITHOGRAPHIC CO. N.Y. (OSBORNE'S PROCESS.)

UNITED STATES PATENT OFFICE.

JOHN BURT, OF STURGIS, MICHIGAN, ASSIGNOR, BY MESNE ASSIGNMENTS, TO ALONZO F. HUBBELL AND EDWIN R. WILLIAMS.

IMPROVEMENT IN VEHICLE-SEATS.

Specification forming part of Letters Patent No. 70,517, dated November 5, 1867; reissue No. 5,446, dated June 17, 1873; application filed October 26, 1872.

*To all whom it may concern:*

Be it known that JOHN BURT, of Sturgis, Michigan, invented a new and Improved Carriage-Seat Back and Sides; and the following is a full, clear, and exact description of the same, such as will enable others skilled in the art to which it pertains to make and use it, reference being had to the accompanying drawings.

Figure 1:
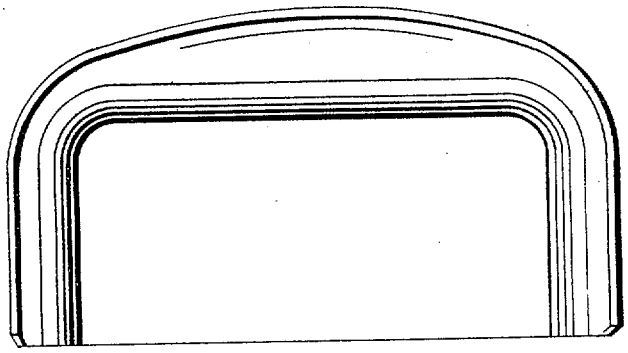
Figure 2:
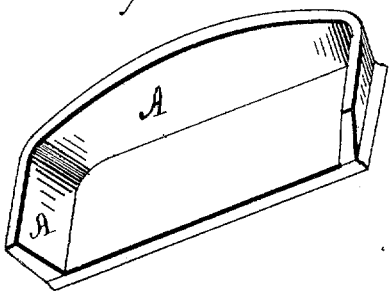

In the drawings, Figure 1 is a plan view, and Fig. 2 a view in perspective, of the invention, in which the letter A represents the back and sides of a vehicle-seat in a continuous piece, which is the subject of this invention.

The invention consists in the back and sides of a vehicle-seat constructed in a single piece from material susceptible of being shaped by bending.

To enable others skilled in the art to which the invention pertains to make and use it, its mode of construction will now be described.

Take a piece of suitable material of proper dimensions, and form or bend it into something like the shape it is ultimately to have. From this properly-formed material the seat back and sides, in a single continuous piece, may be made.

The form into which we prefer to shape the seat back and sides is that wherein the sides or arms and back recline outward from the seat to the top, as shown in the drawings; but this invention consists, broadly, in the back and sides formed in a continuous length from material that will bend.

A former may be used upon which to shape the seat back and sides, and this form may possess the shape designed to be given to the product, communicating to the latter any desired inclination and curvature.

By making the back and sides of a vehicle-seat of one piece of material, we can make vehicle-seats at a far less cost than by the old method with the back and sides in sections, while in elegance of proportion and beauty of finish they are equal to those of the most expensive construction.

We are aware that carriage-seat hand-rails have been formed from a single piece of material bent to the proper shape; but this invention has nothing to do with hand-rails, but with the seat back and sides.

It is proper to observe that we dispense entirely with joints, as we make the back and sides of a continuous piece of material that will bend without joint, which feature, broadly, is the substance of this invention.

Having thus described the invention, what is claimed as new, and desired to be secured by Letters Patent, is—

1. The back and sides of a vehicle-seat, composed of a single continuous piece of material without joint, substantially as set forth.

2. The bent and reclining seat back and sides, formed in a continuous length from a single piece of material, substantially as set forth.

3. A vehicle-seat in which the back and sides are formed from a continuous single piece of material without joint, substantially as set forth.

ALONZO F. HUBBELL. [L. S.]
EDWIN R. WILLIAMS. [L. S.]

Witnesses as to A. F. HUBBELL:
F. W. COGSWELL,
CHAS. COOK.

Witnesses as to E. R. WILLIAMS:
E. A. HITCHCOCK,
E. RICHARDS.